Dec. 4, 1951   D. W. WHITE   2,577,057
VANE TYPE HYDRAULIC CLUTCH
Filed Aug. 8, 1947   2 SHEETS—SHEET 1
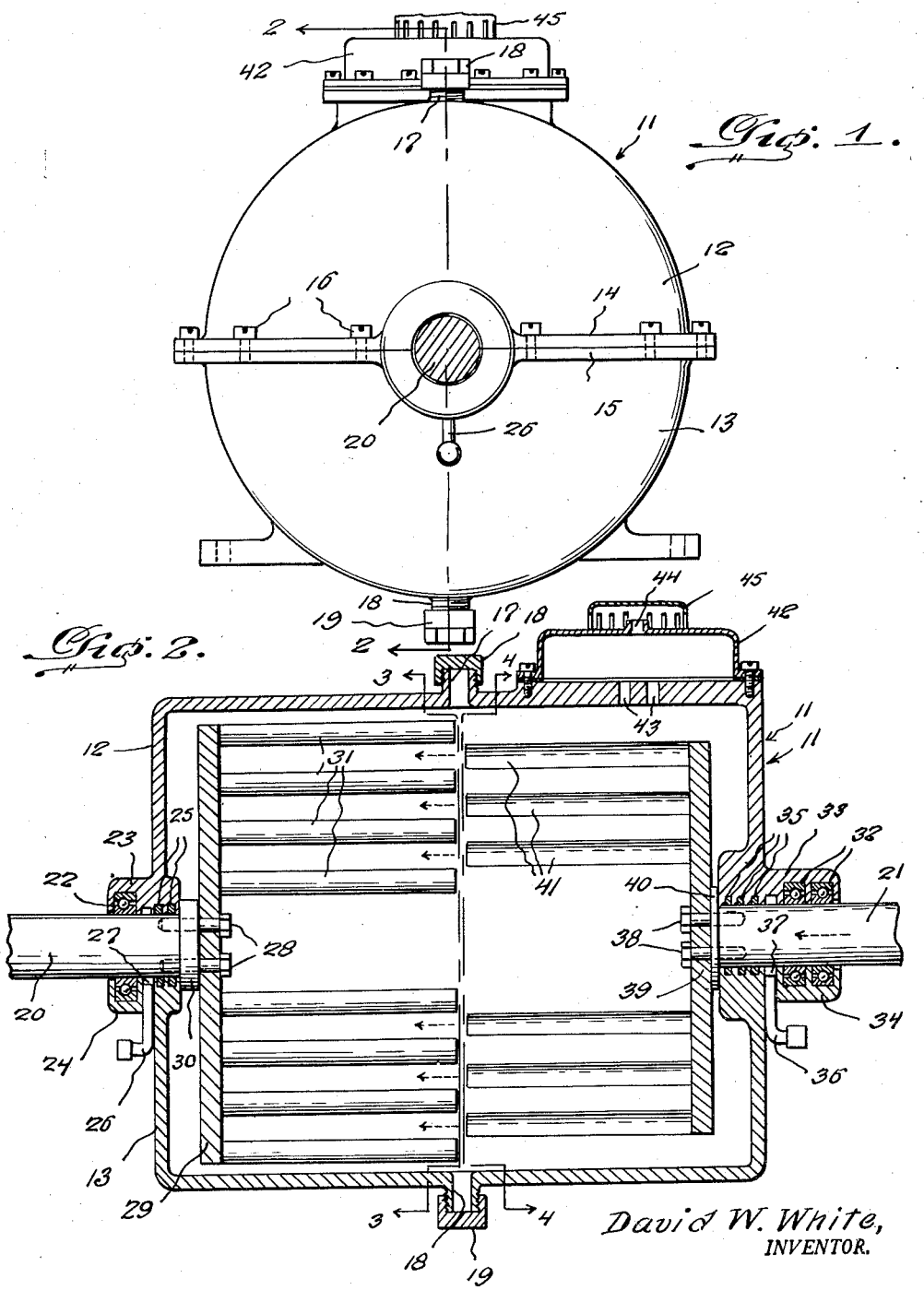
David W. White,
INVENTOR.
BY
McMorrow, Berman & Davidson
ATTORNEYS

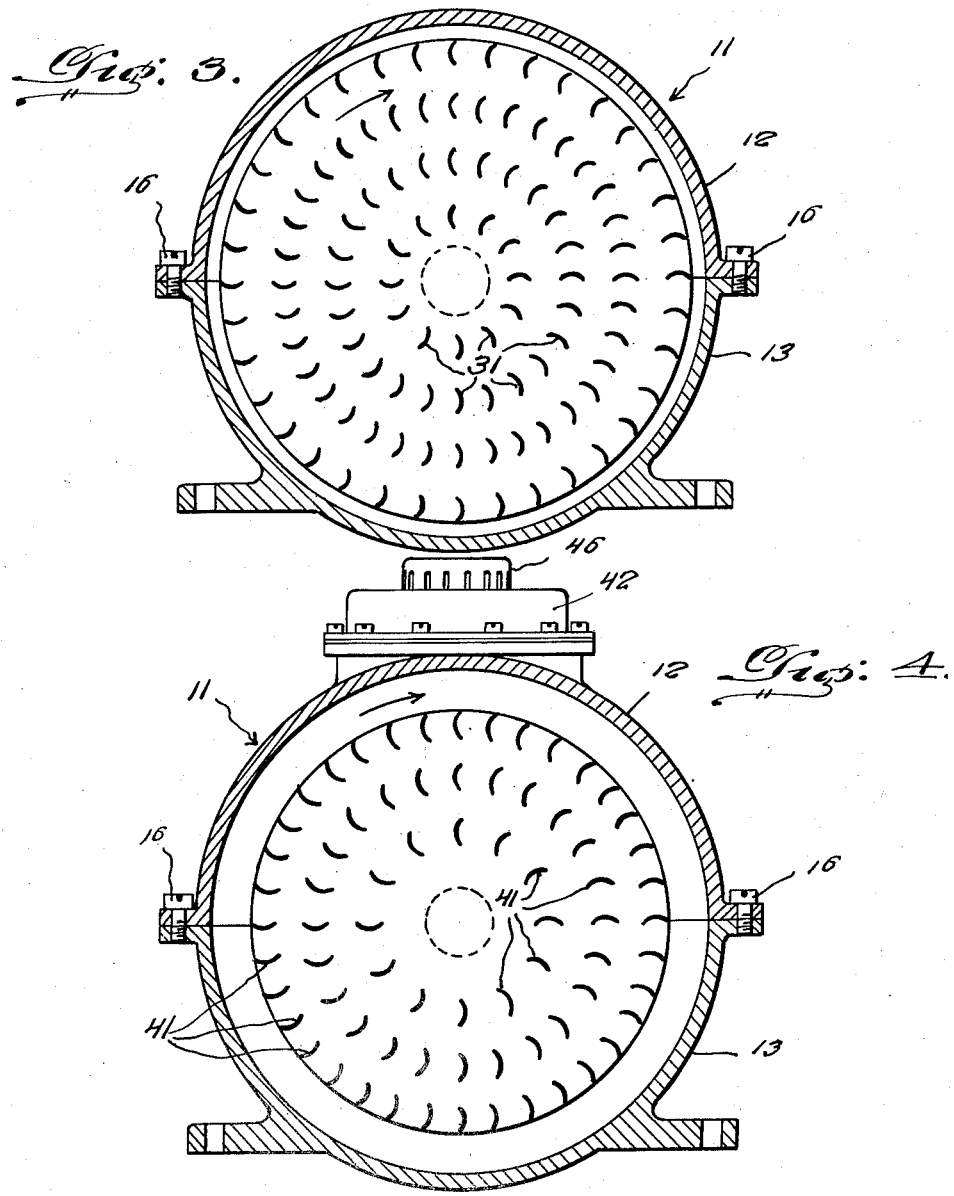

Patented Dec. 4, 1951

2,577,057

UNITED STATES PATENT OFFICE 2,577,057

VANE TYPE HYDRAULIC CLUTCH

David W. White, El Reno, Okla.

Application August 8, 1947, Serial No. 767,374

2 Claims. (Cl. 192—58)

This invention relates to power transmission apparatus, and more particularly to power transmission devices of the hydraulic type.

A main object of the invention is to provide a novel and improved hydraulic clutch apparatus which is very simple in structure, compact in size and reliable in performance.

A further object of the invention is to provide an improved hydraulic clutch apparatus which is inexpensive to manufacture, sturdy in construction and easy to adjust to obtain different torque transmission ratios as required under various loading conditions.

Further objects and advantages of the invention will become apparent from the following description and claims, and from the accompanying drawings, wherein:

Figure 1 is an end elevational view of a hydraulic clutch device constructed in accordance with the present invention.

Figure 2 is a cross-sectional view taken on line 2—2 of Figure 1.

Figure 3 is a cross-sectional view taken on line 3—3 of Figure 2.

Figure 4 is a cross-sectional view taken on line 4—4 of Figure 2.

Referring to the drawings, 11 designates a generally cylindrical housing comprising an upper segment 12 and a lower segment 13 secured together at the horizontal axial plane of the housing at respective flanges 14 and 15 carried by the abutting edges of the segments, through which securing bolts 16 are engaged. At its intermediate portion the top of segment 12 is formed with a filling spout 17 having a cap 17' removably threaded thereon. At the bottom intermediate portion of segment 13 is a drain spout 18 having a cap 19 removably threaded thereon.

Designated at 20 is the driving shaft of the assembly, said shaft 20 being connected to any suitable source of power such as the drive shaft of an internal combustion engine, electric motor, or the like. Designated at 21 is the driven shaft of the assembly, said shaft 21 being connected to the load.

Shaft 20 is journaled in a suitable bearing 22 contained in suitably recessed boss segments 23 and 24 carried by the housing segments 12 and 13 at the end wall of the housing adjacent the driving shaft. Said boss segments are also annularly recessed to receive a pair of deformable packing rings 25, 25 which sealingly engage the shaft 20. Adjacent the bearing 22 said boss segments are also recessed to define an annular collection space 27 for hydraulic liquid leaking past the packing rings, the lower boss segment 24 having a depending conduit 26 secured thereto and opening into the bottom of space 27 for draining off the hydraulic liquid.

Secured to the end of shaft 20 inside the housing 11 by means of bolts 28, 28 is a circular disc member 29, a spacing disc 30 being interposed between disc member 29 and the inside end surfaces of the boss segments 23 and 24. Secured to disc member 29 are a plurality of longitudinally extending curved blades 31 arranged in spaced concentric circular rows, as shown in Figure 3 and terminating slightly short of the median transverse vertical plane of the housing 11. As shown in Figure 2, the vertical spouts 17 and 18 are preferably aligned with respect to said median transverse plane.

Driven shaft 21 is slidably journaled in a pair of bearings 32, 32 contained in suitably recessed boss segments 33 and 34 carried by the housing segments 12 and 13 at the end wall of the housing 11 adjacent said driven shaft 21. Said boss segments are also annularly recessed to receive three deformable packing rings 35 which sealingly engage the shaft 21. Between the packing rings 35 and the bearings 32, 32 said boss segments are also recessed to define an annular collection space 37 for hydraulic liquid leaking past the packing rings, the lower boss segment 34 having a depending conduit 36 secured thereto and opening into the bottom of space 37 for draining off the hydraulic liquid.

Secured to the end of shaft 21 inside the housing 11 by means of bolts 38, 38 is a circular disc member 39, a spacing disc 40 being interposed between disc member 39 and the inside end surfaces of the boss segments 33 and 34. Secured to disc member 39 are a plurality of longitudinally extending curved blades 41 arranged in spaced concentric circular rows, as shown in Figure 4, the rows being located so as to be receivable between the rows of blades 31 on disc member 29 when shaft 21 is moved longitudinally inwardly. The blades 41 normally terminate just short of the transverse vertical intermediate plane of housing 11 and are reversed in curvature with respect to the blades 31.

Secured to the top of housing segment 12 adjacent the driven shaft 21 is an auxiliary housing 42 communicating with the interior of housing 11 by a pair of apertures 43, 43 formed in the top of housing segment 12. Housing 42 has a top opening 44 which is covered by an apertured breather cap 45.

Driven shaft 21 is longitudinally slidable in its bearings, and may be moved inwardly by a suitable control means, not shown. The housing 11 is substantially filled with hydraulic liquid, such as oil or the like.

When shaft 20 is rotated by its driving means, the blades 31 agitate the liquid in housing 11 and produce substantial turbulence therein. In the position of shaft 21 shown in Figure 2, substantially no torque is transmitted to blades 41. When the shaft 21 is moved inwardly by its control means, the circular rows of blades 41 enter the circular spaces between the circular rows of blades 31 carried by the drive shaft 20 and the liquid driven by blades 31 acts on the blades 41 to transmit torque thereto. The degree of torque transmitted will vary with the extent to which blades 41 intermesh with blades 31, so that the application of torque to the load may be smoothly controlled and the torque applied to said load may be increased in a gradual manner.

When shaft 21 is moved inwardly in housing 11, the liquid displaced thereby overflows into top chamber 42. When the shaft 21 is returned to the position shown in Figure 2, the displaced liquid returns to housing 11 through the apertures 43, 43.

The above described clutch structure also functions as a speed control since the speed of the driven blades 41 depends upon their degree of insertion between the blades 31 of the driving shaft.

The clutch device described herein may be employed for starting heavy loads such as connecting locomotive engine drive shafts to traction wheels, to replace conventional clutch devices in motor vehicles, or for starting loads driven by electric motors having relatively low starting torques, such as large synchronous motors and induction motors.

While a specific embodiment of a clutch device of the hydraulic type has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A clutch device comprising, a housing containing hydraulic liquid and including opposite end walls, a drive shaft rotatably supported intermediate its ends in one of said end walls, a disc arranged transversely within said housing and fixedly secured to the end of the drive shaft adjacent thereto, a plurality of curved blades arranged longitudinally of said housing in spaced parallel relation with respect to each other, said blades each having one end fixedly secured to said disc and having the other end spaced from the transverse median plane of said housing, a driven shaft arranged in end to end spaced relation with respect to said drive shaft and slidably and rotatably supported in the other of said end walls, another disc arranged transversely within said housing and fixedly secured to the end of said driven shaft adjacent thereto, and another plurality of curved blades arranged longitudinally of said housing in spaced parallel relation with respect to each other and in offset relation with respect to said first named blades, said last named blades each having one end fixedly secured to said last named disc and having the other end spaced from said transverse median plane.

2. A clutch device comprising, a housing containing hydraulic liquid and including opposite end walls, a drive shaft rotatably supported intermediate its ends in one of said end walls, a disc arranged transversely within said housing and fixedly secured to the end of the drive shaft adjacent thereto, means circumposed about said drive shaft for spacing said disc from said one of said end walls, a plurality of curved blades arranged longitudinally of said housing in spaced parallel relation with respect to each other, said blades each having one end fixedly secured to said disc and having the other end spaced from the transverse median plane of said housing, a driven shaft arranged in end to end spaced relation with respect to said drive shaft and slidably and rotatably supported in the other of said end walls, another disc arranged transversely within said housing and fixedly secured to the end of the driven shaft adjacent thereto, means circumposed about said driven shaft for spacing said last named disc from said other of said end walls, another plurality of curved blades arranged longitudinally of said housing in spaced parallel relation with respect to each other and in offset relation with respect to said first named blades, said last named blades each having one end fixedly secured to said last named disc and having the other end spaced from said transverse median plane, and hand actuable means operatively connected to said driven shaft for sliding the latter toward and away from said drive shaft.

DAVID W. WHITE.

REFERENCES CITED

The following references are of record in the file of this patent:

UNITED STATES PATENTS

| Number | Name | Date |
|---|---|---|
| 881,444 | Schlachter | Mar. 10, 1908 |
| 1,199,361 | Fottinger | Sept. 26, 1916 |
| 1,238,447 | Severy | Aug. 28, 1917 |
| 1,291,871 | Hein | Jan. 21, 1919 |
| 1,428,586 | Harrison | Sept. 12, 1922 |
| 1,748,436 | Arkin | Feb. 25, 1930 |
| 2,342,414 | Magill | Feb. 22, 1944 |
| 2,427,432 | Wilhelmy | Sept. 16, 1947 |